US012533763B1

(12) United States Patent
Cui et al.

(10) Patent No.: US 12,533,763 B1
(45) Date of Patent: Jan. 27, 2026

(54) TURNING APPARATUS WITH MINIMAL QUANTITY LUBRICATION BASED ON MAGNETIC CIRCULATION AND ULTRASOUND-ASSISTED INFILTRATION

(71) Applicants: QINGDAO UNIVERSITY OF TECHNOLOGY, Shandong (CN); HANERGY (QINGDAO) LUBRICATION TECHNOLOGY CO., LTD., Shandong (CN); GUOHUA (QINGDAO) INTELLIGENT PRECISION DRIVE CONTROL TECHNOLOGY RESEARCH INSTITUTE CO., LTD., Shandong (CN); QINGDAO JIMO QINGLI INTELLIGENT MANUFACTURING INDUSTRY RESEARCH INSTITUTE, Shandong (CN)

(72) Inventors: Xin Cui, Shandong (CN); Yulong Wang, Shandong (CN); Yanbin Zhang, Shandong (CN); Peng Gong, Shandong (CN); Guang Wang, Shandong (CN); Mingzheng Liu, Shandong (CN); Min Yang, Shandong (CN); Zongming Zhou, Shandong (CN); Chunjin Wang, Shandong (CN); Xiaoliang Liang, Shandong (CN); Changhe Li, Shandong (CN)

(73) Assignees: QINGDAO UNIVERSITY OF TECHNOLOGY, Shandong (CN); HANERGY (QINGDAO) LUBRICATION TECHNOLOGY CO., LTD., Shandong (CN); GUOHUA (QINGDAO) INTELLIGENT PRECISION DRIVE CONTROL TECHNOLOGY RESEARCH INSTITUTE CO., LTD., Shandong (CN); QINGDAO JIMO QINGLI INTELLIGENT MANUFACTURING INDUSTRY RESEARCH INSTITUTE, Shandong (CN)

( * ) Notice: Subject to any disclaimer, the term of this patent is extended or adjusted under 35 U.S.C. 154(b) by 4 days.

(21) Appl. No.: 18/900,923

(22) Filed: Sep. 30, 2024

(30) Foreign Application Priority Data

Jul. 23, 2024 (CN) .......................... 202410991202.0

(51) Int. Cl.
*B23Q 11/10* (2006.01)
(52) U.S. Cl.
CPC ...... *B23Q 11/1069* (2013.01); *B23B 2250/12* (2013.01)
(58) Field of Classification Search
CPC ................ B23Q 11/1069; B23B 2250/12
See application file for complete search history.

(56) References Cited

U.S. PATENT DOCUMENTS 5,996,739 A * 12/1999 Hoffmann ............... F01M 1/16
184/7.4
8,545,137 B2 * 10/2013 Aiso ....................... C22C 38/04
408/1 R (Continued)

FOREIGN PATENT DOCUMENTS

CN 115488770 12/2022

*Primary Examiner* — Henry Y Liu
(74) *Attorney, Agent, or Firm* — JCIPRNET

(57) ABSTRACT

Provided is a turning apparatus with MQL based on magnetic circulation and ultrasound-assisted infiltration, comprising a turning tool fixed with 2D ultrasonic auxiliary device; a magnetic circulation nozzle and magnetic circulation recycling nozzle arranged on both sides of turning tool; lubricant channels respectively provided inside magnetic circulation nozzle and magnetic circulation recycling nozzle; magnets arranged on peripheries of lubricant channels; polarities of ends of magnets on the two nozzles facing to turning tool are opposite; lubricant channel of magnetic circulation nozzle is connected to one end of first flexible pipe, and another end is connected to lubricant canister after passing through peristaltic pump; one end of second flexible (Continued)

pipe is connected to the peristaltic pump, and another end is connected to a filtering mechanism; one end of third flexible pipe is connected to the magnetic circulation recycling nozzle, and another end is connected to liquid inlet of filtering mechanism.

18 Claims, 13 Drawing Sheets

(56) References Cited

U.S. PATENT DOCUMENTS

| | | | |
|---|---|---|---|
| 9,272,095 B2 * | 3/2016 | Felts | C23C 16/36 |
| 9,895,755 B2 * | 2/2018 | Kondameedi | B23K 26/384 |
| 11,154,885 B2 * | 10/2021 | Nath | B23B 29/242 |
| 11,707,810 B2 * | 7/2023 | Li | B23Q 11/10 |
| | | | 29/559 |
| 2012/0085209 A1 * | 4/2012 | Aiso | C21D 1/76 |
| | | | 83/22 |
| 2012/0252709 A1 * | 10/2012 | Felts | A61M 5/3129 |
| | | | 508/100 |
| 2014/0271284 A1 * | 9/2014 | Gray | H02K 9/06 |
| | | | 310/90 |
| 2015/0249312 A1 * | 9/2015 | Tsushima | F16C 32/0402 |
| | | | 372/58 |
| 2018/0154465 A1 * | 6/2018 | Kondameedi | B23P 15/30 |
| 2018/0178184 A1 * | 6/2018 | Holland | B03C 1/28 |
| 2020/0376565 A1 * | 12/2020 | Li | B23Q 11/1046 |
| 2021/0031272 A1 * | 2/2021 | Li | B23B 27/145 |
| 2022/0339716 A1 * | 10/2022 | Schoop | B23C 3/16 |
| 2023/0042406 A1 * | 2/2023 | Li | B23Q 7/05 |
| 2023/0058499 A1 * | 2/2023 | Yildirim | B23B 29/24 |

* cited by examiner

TURNING APPARATUS WITH MINIMAL QUANTITY LUBRICATION BASED ON MAGNETIC CIRCULATION AND ULTRASOUND-ASSISTED INFILTRATION

CROSS-REFERENCE TO RELATED APPLICATION

This application claims the benefit of priority from Chinese Patent Application No. 202410991202.0, filed on Jul. 23, 2024. The content of the aforementioned application, including any intervening amendments thereto, is incorporated herein by reference in its entirety.

TECHNICAL FIELD

The invention relates to the technical field of ultra-precision machining, in particular to a turning apparatus with minimal quantity lubrication (MQL) based on magnetic circulation and ultrasound-assisted infiltration.

BACKGROUND

The statements in this section merely provide background information related to the present invention and are not necessarily prior art.

Ultra-precision machining refers to the general term for machining technology in which the shape size accuracy reaches submicron level and the surface roughness Ra reaches nanometer level. The ultra-precision machining currently includes four fields: ultra-precision cutting, ultra-precision grinding, ultra-precision polishing, and ultra-precision special machining (such as electron beam, ion beam, laser, lithography machining).

Hard and brittle materials, such as optical glass, hard alloy, semiconductor, ceramics, etc., are used more and more because of their special superior properties. Compared with optical plastic elements, the optical glass elements have better and more stable mechanical and optical properties. Tungsten carbide has become an ideal material for glass molding molds due to its high hardness, low expansion coefficient, high temperature oxygen resistance and anti-adhesion properties. The large aperture reflector of large deep space exploration telescopes adopts silicon carbide with light weight, low thermal expansion coefficient and good thermal conductivity. These brittle and hard materials (e.g. the sapphire material for missile head cover) are usually machined by ultra-precision grinding, polishing and special machining techniques. With the development of science and technology and the progress of society, the demand for machining of functional surface of free-form surfaces and micro-nano structures of parts is increasing day by day. From the flexibility of machining shape, size and machining efficiency, ultra-precision machining relying on natural diamond turning tools has become a more ideal manufacturing process.

However, machining hard and brittle materials with single-point diamond turning tools is a machining process of "confront the tough with toughness", and cracks are easy to appear on the machined surface, and the turning tools are easy to crack and damage. Although ductile mode cutting can be realized on the hard and brittle materials by a mean of plastic removal to obtain smooth machined surface quality when the cutting parameters are less than a certain value, the critical cutting depth corresponding to the brittle plastic transition point is very small in the traditional ultra-precision cutting process, and sometimes the machine tool cannot even realize such accurate motion control. For example, the critical depth of cutting for ductile mode machining of mono-crystalline silicon is about 200 nm, while the critical depth of cut for silicon carbide is only 29 nm. Therefore, the hard and brittle materials bring great challenges to traditional ultra-precision machining technology.

Composite ultra-precision machining technology, such as ultrasonic-assisted machining, can significantly improve the critical depth of cut for the hard and brittle materials by several times or even dozens of times, which makes it possible for diamond turning tools to cut the hard and brittle materials, especially high-frequency ultrasonic-assisted machining. However, due to the direct contact between the diamond turning tool and the hard and brittle material in the ultrasonic-assisted machining process, the wear of the turning tool is still serious. At present, when ultrasonic-assisted cutting the workpiece of tungsten carbide, after a nominal cutting distance of 4 m, the diamond tool flank edge will appear a wear mark with a width of about 5 μm, and then make the machined surface appear defects. Tool wear, workpiece surface integrity deterioration and high processing costs make ultrasonic-assisted machining of the hard and brittle materials only stay at the laboratory level and have not been applied.

In order to solve the above problems, the MQL technology is an effective solution. However, there are certain problems:

Macroscopically, the lubricant is supplied to the cutting area in the form of micro droplets, and the random distribution of fog droplets leads to the cutting area not being in a lubricating state at all times. Microscopically, the lubricant in the tool/workpiece contact area lacks infiltration power; especially with the assistance of ultrasound, the concession of the cutting tool does not form a closed pumping space.

Chinese patent application CN115488770A discloses a magnetic field assisted powerful grinding trace lubricant supply and recycling device, wherein by applying a magnetic field, the magnetic nanofluid can exert the best lubrication and cooling performance. However, in the solution of the above patent application, the lubricant is used for cooling and lubrication in the form of atomization, which still has the disadvantage that the cutting area is not always in a lubricated state due to the randomness of distribution of fog droplets. Moreover, during the processing process, there is no infiltration space for lubricant between the tool and the workpiece, so the improvement effect of cooling and lubrication is limited. Furthermore, this device is only effective for grinding. For diamond tool turning, there is no effective lubricant infiltration technology.

SUMMARY

Aiming at the defects existing in the prior art, the present invention aims to provide a turning apparatus with MQL based on magnetic circulation and ultrasound-assisted infiltration, which can enhance the infiltration performance of the lubricant in a very small cutting area of a diamond cutting tool, so that the lubricating effect is improved.

To achieve the above object, the present invention is achieved through the following technical solutions.

In a first aspect, an embodiment of the present invention provides a turning apparatus with MQL based on magnetic circulation infiltration, comprising a turning tool being fixed with a two-dimensional ultrasonic auxiliary device, wherein a magnetic circulation nozzle and a magnetic circulation recycling nozzle are respectively arranged on both sides of the turning tool, a lubricant channel is respectively provided inside the magnetic circulation nozzle and the magnetic circulation recycling nozzle, a magnet is provided on a periphery of the lubricant channel, wherein the magnet provided on the periphery of the lubricant channel of the magnetic circulation nozzle is a electromagnet, a coil of the electromagnet is connected to an alternating current (AC) power supply, the lubricant channel of the magnetic circulation nozzle is connected to one end of a first flexible pipe, another end of the first flexible pipe is connected to a lubricant canister after passing through a peristaltic pump; the peristaltic pump is further connected to one end of a second flexible pipe, another end of the second flexible pipe is connected to an extract opening of the filtering mechanism, the magnetic circulation recycling nozzle is connected to one end of a third flexible pipe, and another end of the third flexible pipe is connected to a liquid inlet of the filtering mechanism.

In a second aspect, an embodiment of the present invention provides a turning apparatus with MQL based on magnetic circulation and ultrasound-assisted infiltration, comprising a turning tool being fixed with a two-dimensional ultrasonic auxiliary device, wherein a magnetic circulation nozzle and a magnetic circulation recycling nozzle are arranged on both sides of the turning tool, a lubricant channel is respectively provided inside the magnetic circulation nozzle and the magnetic circulation nozzle, and a magnet is provided on a periphery of the lubricant channel, wherein polarities of ends of the magnets arranged on the periphery of the lubricant channel of the magnetic circulation nozzle and the periphery of the lubricant channel of the magnetic circulation recycling nozzle facing the turning tool are opposite; the lubricant channel of the magnetic circulation nozzle is connected to one end of a first flexible pipe, another end of the first flexible pipe is connected to a lubricant canister after passing through a peristaltic pump, the peristaltic pump is further connected to one end of a second flexible pipe, another end of the second flexible pipe is connected to an extract opening of a filtering mechanism; the magnetic circulation recycling nozzle is connected to one end of a third flexible pipe, and another end of the third flexible pipe is connected to a liquid inlet of the filtering mechanism.

Optionally, the magnetic circulation nozzle is arranged towards a rake face of the turning tool and forms a set acute angle with the rake face of the turning tool, and the magnetic circulation recycling nozzle is arranged towards a flank face of the turning tool and forms the set acute angle with the flank face of the turning tool.

Optionally, a degree of the set acute angle is 45°.

Optionally, the magnetic circulation nozzle and the magnetic circulation recycling nozzle are both connected to a fixing mechanism, the fixing mechanism is fixed on a fixture base, and the fixture base is fixed on a support base.

Optionally, the fixing mechanism comprises a first supporting arm, one end of the first supporting arm is universally connected to the fixture base, another end of the first supporting arm is rotatably connected to one end of a second supporting arm, another end of the second supporting arm is universally connected to a clamping part, a lubricant flow pipeline of the clamping part is clamped and fixed, the lubricant flow pipeline of the fixing mechanism connected to the magnetic circulation nozzle is connected to the magnetic circulation nozzle, and the lubricant flow pipeline of the fixing mechanism connected to the magnetic circulation recycling nozzle is connected to the magnetic circulation recycling nozzle.

Optionally, a conical cover is arranged at an end of the magnetic circulation recycling nozzle facing the turning tool, and one end of the conical cover with a smaller area is connected to the magnetic circulation recycling nozzle.

Optionally, the filtering mechanism comprises a filtering box, a liquid inlet connected to the second flexible pipe is provided at one end of a box wall at the top of the filtering box, a filtering plate is arranged obliquely in the filtering box, a liquid inlet end of the filtering plate is arranged below the liquid inlet and higher than a liquid outlet end of the filtering plate, a chip storage groove is provided at one side of the liquid outlet end, an internal space of the filtering box above the filtering plate is connected to an extract opening, and the extract opening is connected to the second flexible pipe.

Optionally, an ultrasonic vibration device is arranged below the filtering box to apply ultrasonic vibration to the filtering box.

Optionally, the magnetic circulation nozzle and the magnetic circulation recycling nozzle both comprise a shell, one end of the shell is provided with an spray part, another end of the shell is provided with a gasket, the magnet is arranged between the gasket and the spray part, the magnet is sleeved on the periphery of the lubricant flow pipeline, and the spray part is provided with a channel communicated with the lubricant flow pipeline.

The beneficial effects of the present invention are as follows:

1. According to the present invention, the turning device is provided with a magnetic circulation nozzle and a magnetic circulation recycling nozzle, magnets are arranged in the magnetic circulation nozzle and the magnetic circulation recycling nozzle, and a magnetic field can be applied to the sprayed magnetic nanofluid lubricant. Meanwhile, the turning tool is connected with a two-dimensional ultrasonic auxiliary device, and the two-dimensional ultrasonic auxiliary device can apply ultrasonic vibration to the turning tool to drive the cutting chips to be separated. The two-dimensional ultrasonic auxiliary device clamps the turning tool to perform the concession, thereby providing a lubricant infiltration space between the turning tool and the workpiece. The magnetic field provides traction force to the lubricant, so that the lubricant can more fully infiltrate a cutting area between the turning tool and the workpiece, and the cooling and lubricating effect is further improved; meanwhile, the magnetic circulation nozzle and the magnetic circulation recycling nozzle cool and lubricate the cutting area in a jet mode, so that defects existing in a cooling and lubricating mode of adopting atomized liquid droplets are avoided.

2. According to the present invention, in the turning device, the magnet in the magnetic circulation nozzle is electromagnet, which can generate an alternating magnetic field. When the polarities of the ends of the magnets in the magnetic circulation nozzle and the magnetic circulation recycling nozzle facing the turning tool are the same, a repulsive force can be generated, thereby driving the lubricant to tear and cut, and apply a thrust to the lubricant towards the cutting area between the turning tool and the workpiece, and further improving the infiltration effect of the lubricant on the cutting area.

3. According to the present invention, the turning device is provided with a magnetic circulation recycling nozzle, which is connected to one end of the second flexible pipe, and the second flexible pipe is connected to the filtering mechanism after passing through the peristaltic pump, and the magnetic circulation recycling nozzle can form negative pressure through the peristaltic pump, so as to better recycle the magnetic nanofluid lubricant, and the chips in the lubricant can be filtered through the filtering mechanism, so as to realize the recycling of the lubricant for further reuse and reduce the processing cost.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

In the figures: I, box body; II, filtering mechanism; III, peristaltic pump; IV, ultra-precision cutting mechanism; V, ultra-precision machining lathe;

I-1, lubricant canister; I-2, first flexible pipe; I-3, touch screen; I-4, second flexible pipe; II-1, liquid outlet; II-2, L-shaped steel; II-3, filtering box; II-4, ultrasonic vibration device; II-5, liquid inlet; II-6, screws; II-7, chip storage groove; II-8, filtering plate; II-9, chip filtering hole; II-10, extract opening; II-11, gasket;

III-1, wire interface; III-2, pillar bolts; III-3, first bracket; III-4, second bracket; III-5, first joint cap; III-6, second joint cap; III-7, third bracket; III-8, buckle; III-9, joint rod; III-10, motor; III-11, shaft sleeve; III-12, flexible pipe bracket; III-13, motor accessory; III-14, fourth bracket; III-15, third joint cap; III-16, fourth joint cap;

IV-1, support base; IV-2, fixture base; IV-3, ultra-precision machining tool fixture; IV-4, support arm; IV-5, movable bolt; IV-6, lubricating fluid flow pipeline; IV-7, magnetic circulation recycling nozzle; IV-8, clamping part; IV-9, magnetic circulation nozzle; IV-10, turning tool;

IV-7-1, spray part; IV-7-2, shell; IV-7-3, magnet; IV-7-4, gasket; IV-7-5, fixing screw;

IV-9-1, spray part; IV-9-2, shell; IV-9-3, magnet; IV-9-4, gasket; IV-9-5, fixing screw;

1—coil; 2—enameled wire; 3—iron core.

DETAILED DESCRIPTION OF DISCLOSURED EMBODIMENTS

Embodiment 1

Figure 1:
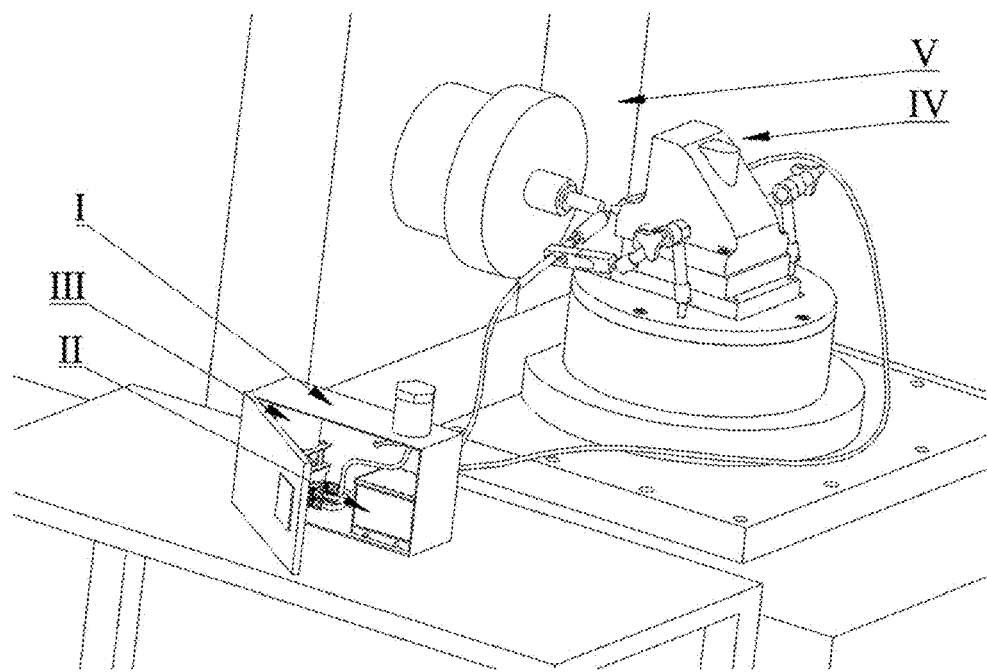
FIG. 1 is a schematic diagram of an overall structure of Embodiment 1 of the present invention.

The present embodiment provides a turning apparatus with MQL based on magnetic circulation and ultrasound-assisted infiltration magnetic circulation, as shown in FIG. 1, comprising a turning tool, wherein a two-dimensional ultrasonic auxiliary device is fixed with the turning tool, the two-dimensional ultrasonic auxiliary device can apply ultrasonic vibration to the turning tool; a magnetic circulation nozzle and a magnetic circulation recycling nozzle are respectively arranged on both sides of the turning tool, wherein the magnetic circulation nozzle is used for spraying magnetic nano lubricant to a cutting area between the turning tool and a workpiece, the magnetic circulation recycling nozzle is used for recovering a mixed solution of magnetic nano lubricant and turning chips; a magnet is respectively arranged in the magnetic circulation nozzle and the magnetic circulation recycling nozzle, wherein the magnet in the magnetic circulation nozzle is a first magnet, and the magnet in the magnetic circulation recycling nozzle is a second magnet. In the present embodiment, the first magnet is an electromagnet, and the second magnet is a permanent magnet.

The magnetic circulation nozzle is connected to one end of a first flexible pipe, the first flexible pipe is connected to a lubricant canister after passing through a peristaltic pump, the lubricant canister is used for containing magnetic nano lubricant, the peristaltic pump can drive the magnetic nano lubricant of the lubricant canister to enter the magnetic circulation nozzle through the first flexible pipe, and the magnetic nano lubricant is sprayed to a cutting area where the turning tool contacts a workpiece through the magnetic circulation nozzle; the magnetic circulation recycling nozzle is connected to one end of a third flexible pipe, the third flexible pipe is connected to a liquid inlet of a filtering mechanism, the filtering mechanism is connected to a peristaltic pump through a second flexible pipe, gas in the filtering mechanism is sucked out under the action of the peristaltic pump, a negative pressure is generated in the magnetic circulation recycling nozzle, the magnetic nano lubricant can be recycled by the magnetic circulation recycling nozzle through the negative pressure, a mixed solution of the recycled magnetic nano lubricant and chips enters the filtering mechanism, the magnetic nano lubricant is filtered by the filtering mechanism, and after the operation is completed, the magnetic nano lubricant is discharged through a liquid outlet valve for recycling.

In the present embodiment, on the one hand, the magnetic nano lubricant can surround a cutting point by means of the magnetic field generated by the magnetic circulation nozzle and the magnetic circulation recycling nozzle, so that the magnetic nano lubricant fully infiltrates the cutting area between the turning tool and the workpiece; on the other hand, under the action of the magnetic field, the viscosity of the magnetic nano lubricant can be increased, which plays a buffer effect between the turning tool and the workpiece.

The electromagnet can be an existing electromagnet and comprises a coil 1, an enameled wire 2 and an iron core 3, wherein the coil is connected to an AC power supply and driven by the AC; the electromagnet of the magnetic circulation nozzle can generate an alternating electromagnetic field and simultaneously supply magnetic nano lubricant; and, the magnetic circulation recycling nozzle can generate a permanent magnetic field and simultaneously recover the lubricant.

In the present embodiment, as shown in FIG. 1, the turning device comprises a box body I, a filtering mechanism II, a peristaltic pump III, an ultra-precision cutting mechanism IV, and an ultra-precision machining lathe V.

Figure 2:
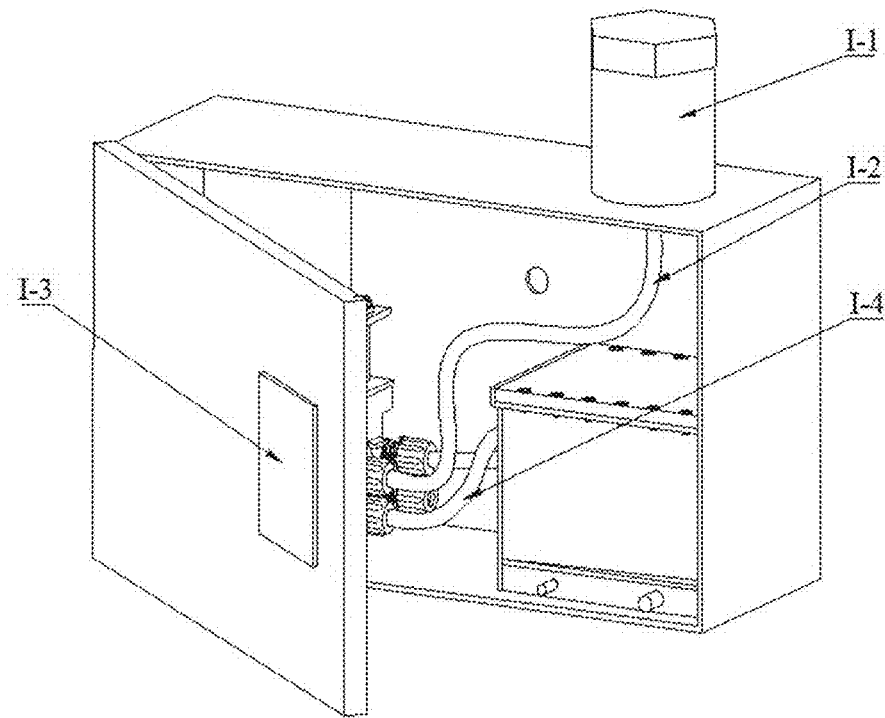
FIG. 2 is an assembly diagram of a box body, a filtering mechanism and a peristaltic pump in Embodiment 1 of the present invention.

As shown in FIG. 2, the filtering mechanism II and the peristaltic pump III are integrated in the box body I and are used for delivering the magnetic nano lubricant to the magnetic circulation nozzle through the peristaltic pump III, and the magnetic nano lubricant at the magnetic circulation nozzle is sprayed to the processing area of the workpiece for cooling and lubricating under the action of the peristaltic pump III and the magnetic circulation.

Wherein, the filtering mechanism II is used for filtering and separating the mixture of the recycled magnetic nano lubricant and the chips, and the peristaltic pump III, on one hand, is used for delivering the magnetic nano lubricant in the lubricant canister to the magnetic circulation nozzle, and on the other hand, is used for extracting the gas in the filtering mechanism II to generate negative pressure, so that the recycled magnetic nano lubricant is delivered to the filtering mechanism II for filtering and separating.

The box body I is used for bearing the filtering mechanism II and the peristaltic pump III and is divided into a left part and a right part, wherein the left part is a mounting area of the peristaltic pump III, and the right part is a mounting part of the filtering mechanism II; an upper part of the outside of the box body I is provided with a lubricant canister I-1 is connected to the peristaltic pump III through a first flexible pipe I-2, and magnetic nano lubricant is provided to the workpiece being cut through the power of the peristaltic pump III.

Magnets or hooks can be set on the back of the box body I, and in practical application, the equipment can be adsorbed or attached to the housing of the ultra-precision machining lathe V and other facilities at any time to facilitate the movement or fixation of the equipment; a flat area in front of a cover of the box body I is used to mount a touch screen I-3 to realize human-computer interaction.

Figure 3:
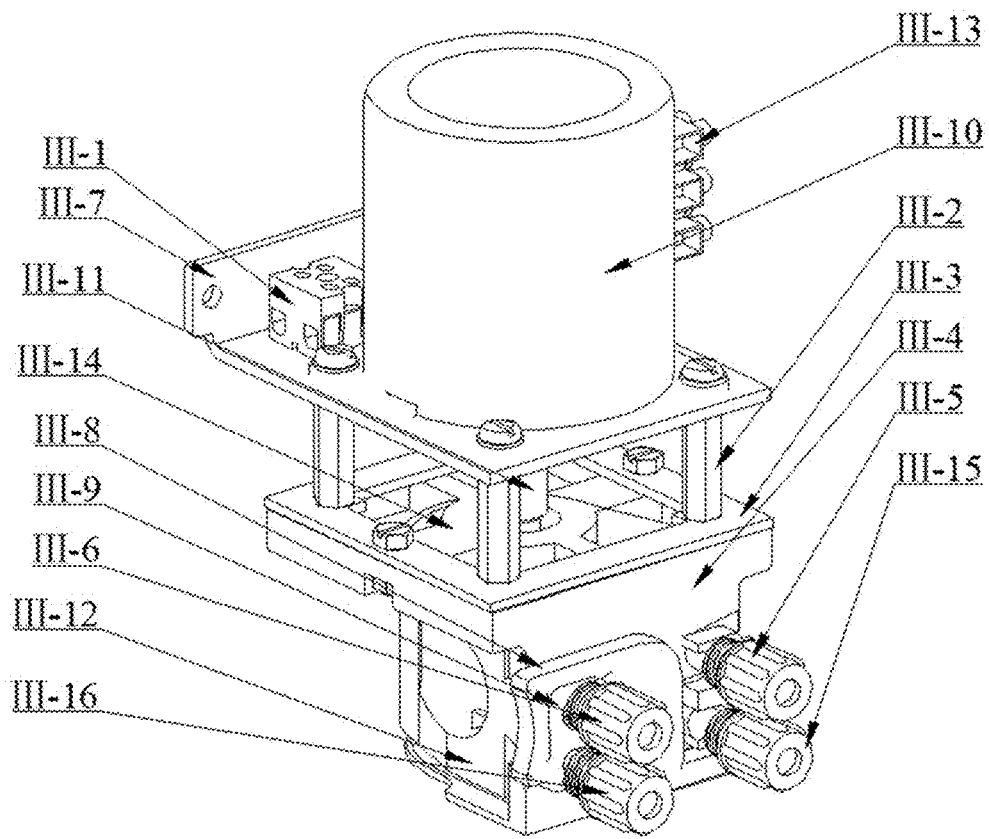
FIG. 3 is a structure diagram of the peristaltic pump of Embodiment 1 of the present invention.

The peristaltic pump III can be made of existing equipment, as shown in FIG. 3, comprising a wire interface III-1, pillar bolts III-2, a first bracket III-3, a second bracket III-4, a first joint cap III-5, a second joint cap III-6, a third bracket III-7, a buckle III-8, a joint rod III-9, a motor III-10, a shaft sleeve III-11, a flexible pipe bracket III-12, a motor accessory III-13, a fourth bracket III-14, a joint cap 3 III-15, a fourth joint cap III-16, wherein the first joint cap III-5, the second joint cap III-6, the third joint cap III-15 and the fourth joint cap III-16 are fixed by buckles III-8, the joint cap is connected to the joint rod III-9, the joint rod III-9 is connected to the flexible pipe inside the peristaltic pump III, the first flexible pipe I-2 and the second flexible pipe I-4 are fixed through the flexible pipe bracket III-12, a lower part and an upper part of the peristaltic pump III are fixed through the first bracket III-3, the third bracket III-7 and the pillar bolt III-2; the upper part is a motor assembly, comprising the motor III-10, the wire interface III-1, and the motor attachment III-13, providing power for peristaltic pump III.

Specifically, the second joint cap III-6 is connected to the first flexible pipe I-2, the first flexible pipe I-2 is connected to the lubricant canister I-1, magnetic nano lubricant is provided for the cutting area through the peristaltic pump III, wherein the magnetic nano lubricant flows through the first flexible pipe I-2 inside the peristaltic pump III, and is output from the second joint cap III-6 of the first flexible pipe I-2 to the magnetic circulation nozzle IV-9 being connected.

Wherein, there are two flexible pipes connected to the flexible pipe connecting position of the peristaltic pump III, which respectively are the first flexible pipe I-2 and the second flexible pipe I-4; wherein, the first flexible pipe I-2 is connected into the lubricant canister I-1 from the second joint cap III-6, and output from the lubricant canister I-1 from the first joint cap III-5, and then connected to the magnetic circulation nozzle IV-9 after the output; while the second flexible pipe I-4 is connected out from an extract opening II-10 of the filtering mechanism II, then connected to the fourth joint cap III-16, for sucking out the air in the filtering mechanism II to generate negative pressure inside the filtering mechanism II, the magnetic circulation recycling nozzle IV-7 sucks the mixed solution of the recycled magnetic lubricant and chips into the third flexible pipe, the third flexible pipe is then connected to the liquid inlet II-5 of the filtering mechanism II, so that the mixed solution flows into the chip filtering mechanism II to separate the magnetic lubricant from the chips.

The peristaltic pump III is internally connected to the first flexible pipe I-2 and the second flexible pipe I-4 to provide power for inputting the lubricant and outputting the air.

The peristaltic pump III can be connected to the first flexible pipe I-2 and the second flexible pipe I-4 in a manner known in the art and will not be described in detail herein.

Figure 12:
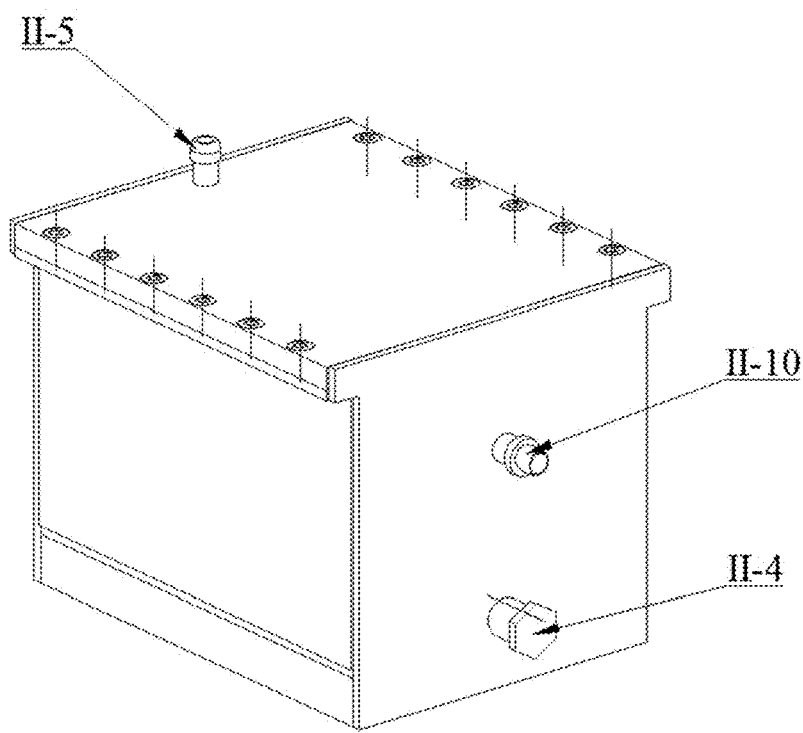
FIG. 12 is a structure diagram of the filtering mechanism of Embodiment 1 of the present invention.
Figure 13:
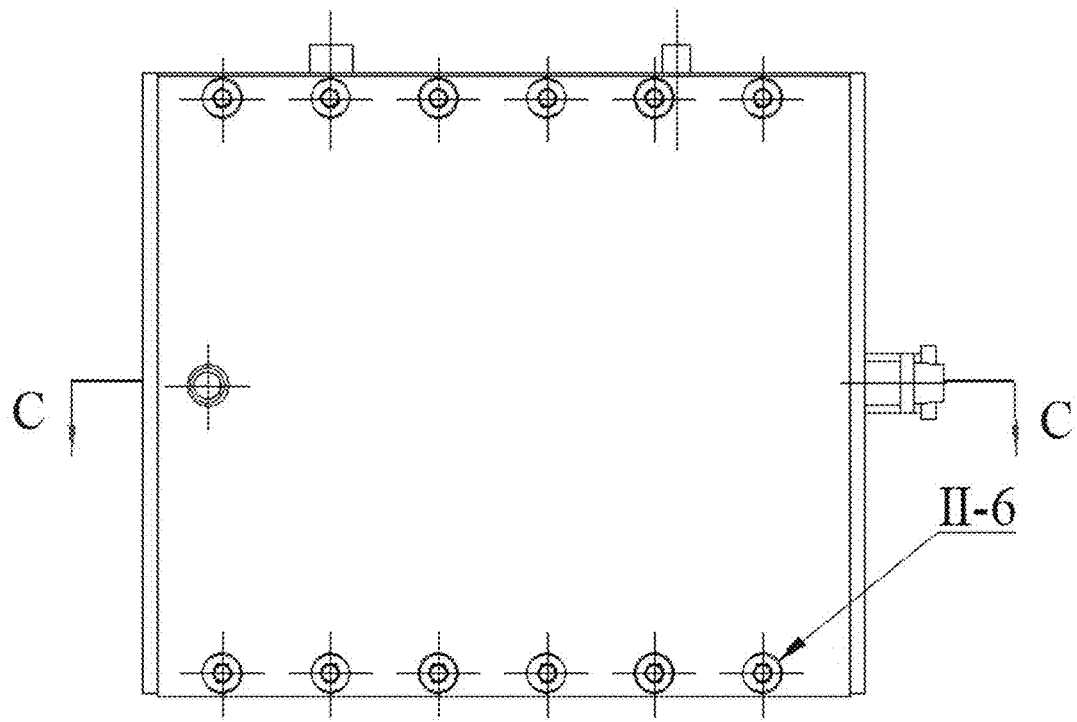
FIG. 13 is a vertical view of the filtering mechanism of Embodiment 1 of the present invention.
Figure 14:
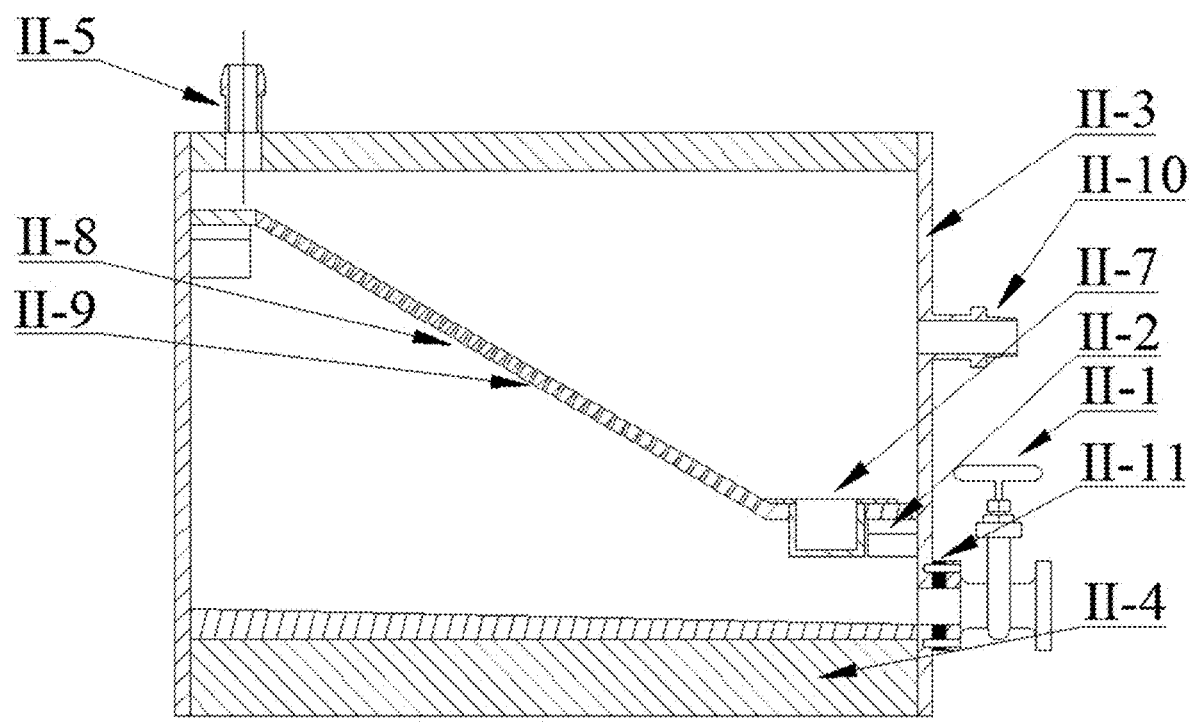
FIG. 14 is a schematic view of the cross-section C of FIG. 13 of the present invention.

As shown in FIGS. 12 to 14, the filtering mechanism II mounted in the right space of the box body I includes a valve II-1, an L-shaped steel II-2, a filtering box II-3, an ultrasonic vibration device II-4, a liquid inlet II-5, screws II-6, chip storage groove II-7, a filtering plate II-8, chip filtering hole II-9, an extract opening II-10, and a gasket II-11.

Wherein, the filtering box II-3 comprises a box body I with an open top, a box cover is fixed on the box body I through screws II-6, the liquid inlet II-5 is arranged on one side of the top of the filtering box II-3, the liquid inlet II-5 is connected to a third flexible pipe, the filtering plate II-8 is arranged in the filtering box II-3 and is arranged obliquely, wherein a height of the liquid inlet end of the filtering plate II-8 is higher than that of the liquid outlet end, and the liquid inlet end of the filtering plate II-8 is positioned below the liquid inlet II-5, one side of the liquid outlet end is provided with the chip storage groove II-7 for storing chip sliding down along the filtering plate II-8, the chip storage groove II-7 is fixed on the box wall of the filtering box II-3 through the L-shaped steel II-2; the filtering plate II-8 divides the inner space of the filtering box II-3 into an upper space and a lower space, wherein a liquid outlet II-1 is arranged on the box wall of the filtering box II-3 corresponding to the lower space, a valve II-1 is arranged at the liquid outlet II-1, and a gasket II-11 is arranged between the liquid outlet II-1 and the valve II-1 to play a sealing role.

The ultrasonic vibration device II-4 is arranged below the filtering box II-3, and is used for applying ultrasonic vibration to the filtering box II-3. The ultrasonic vibration device II-4 can adopt existing equipment, and its specific structure is not described in detail here.

The mixed solution of the magnetic nano lubricant and chips is recycled into the third flexible pipe through the magnetic circulation recycling nozzle IV-7, the third flexible pipe is connected to the liquid inlet II-5, the mixed solution of magnetic nano lubricant and chips falls into the filtering plate II-8 through the liquid inlet II-5, and the chips and the magnetic lubricant are separated on the filtering plate II-8, wherein in the separation process, the chips and the magnetic nano lubricant are separated rapidly through the assistance of the ultrasonic vibration device II-4, the separated chips flow into the chip storage groove II-7, the filtered magnetic nano lubricant is stored in a space below the filtering plate II-8, the bottom wall of the filtering box in the lower space is obliquely arranged and inclined towards the liquid outlet II-1, and after a valve at the liquid outlet II-1 is opened, the magnetic nano lubricant is conveniently discharged through the liquid outlet II-1 for recycling.

Wherein, the small holes with size of 33×38 and a diameter of 0.5 mm are evenly distributed on the filtering plate II-8, for filtering the mixed solution of the chips and the magnetic nano lubricant.

An extract opening II-10 is arranged in the space of the filtering box II-3 above the filtering plate II-8 and connected to the second flexible pipe I-4, and the second flexible pipe I-4 is connected to the peristaltic pump III, the peristaltic pump III pumps out air in the filtering box II-3 through the second flexible pipe I-4 to form negative pressure.

Figure 4:
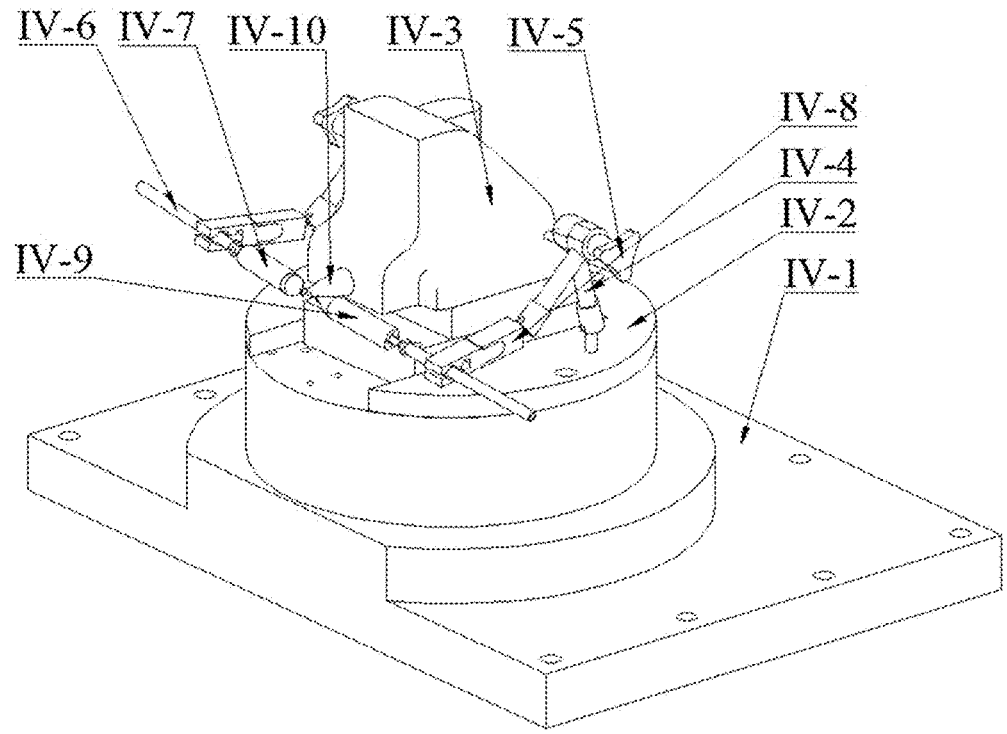
FIG. 4 is an assembly diagram of a fixing mechanism with a magnetic circulation nozzle and a magnetic circulation recycling nozzle of Embodiment 1 of the present invention.
Figure 5:
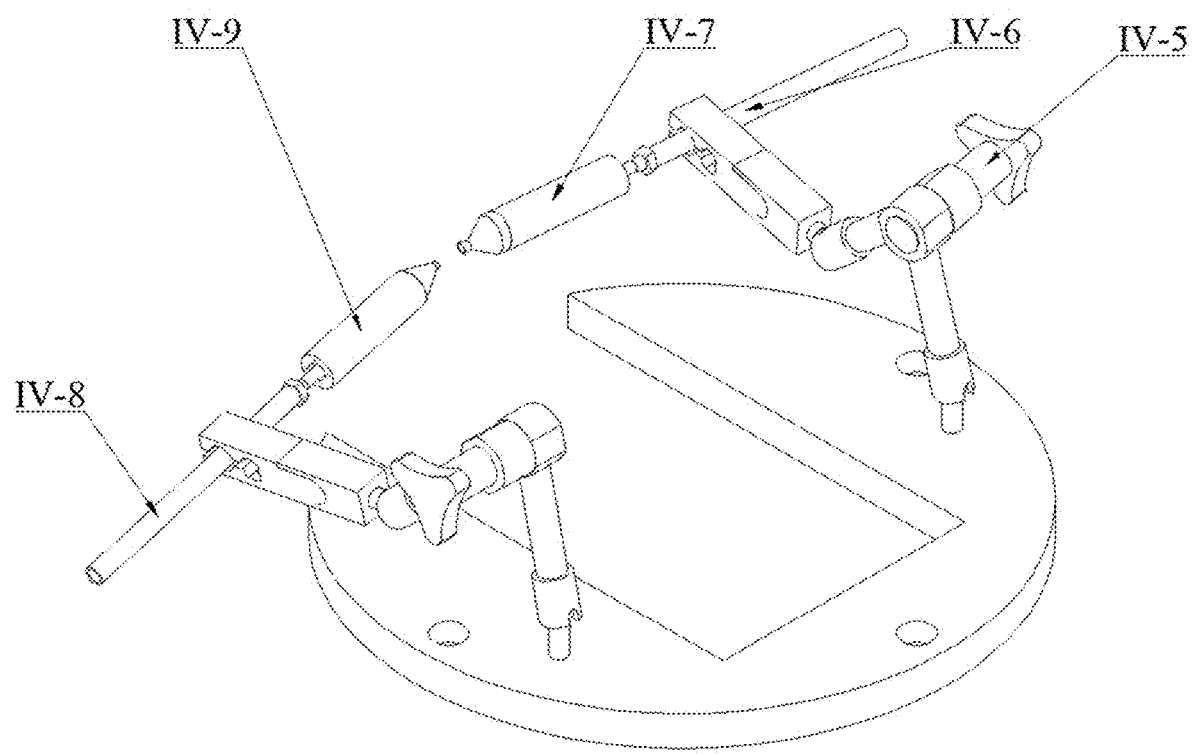
FIG. 5 is a structure diagram of the fixing mechanism of Embodiment 1 of the present invention.

As shown in FIGS. 4 to 5, the ultra-precision cutting mechanism IV comprises a support base IV-1, a fixture base IV-2, an ultra-precision machining tool fixture IV-3, a support arm IV-4, a movable bolt IV-5, a magnetic lubricant flow pipeline IV-6, a magnetic circulation recycling nozzle IV-7, a clamping part IV-8, a magnetic circulation nozzle IV-9, and a turning tool IV-10.

Wherein, the support base IV-1 is fixed on the ultra-precision machining lathe V, the fixture base IV-2 is fixed on the support base IV-1, the ultra-precision machining tool fixture IV-3 is fixed on the fixture base IV-2, the support arm IV-4 is movably connected to the fixture base IV-2, the magnetic circulation nozzle IV-9 and the magnetic circulation recycling nozzle IV-7 are clamped by the clamping part IV-8, and the ultra-precision machining tool fixture IV-3 clamps and fixes the turning tool IV-10. In the present embodiment, the ultra-precision machining tool fixture IV-3 uses a two-dimensional ultrasonic vibration auxiliary device, which can apply ultrasonic vibration to the turning tool IV-10, so as to reserve an infiltration space between the turning tool IV-10 and the workpiece. The two-dimensional ultrasonic vibration auxiliary device can adopt existing equipment, and the specific structure thereof is not described in detail here.

In the present embodiment, the support arm IV-4 is provided as two, namely, a first support arm and a second support arm, wherein the first support arm and the second support arm are rotatably connected, specifically the ends of the first support arm and the second support arm for connection are both connected with the movable bolt IV-5 through threads, thus realizing the rotational connection of the first support arm and the second support arm; one end of the first support arm is connected to the movable bolt IV-5 through threads, and another end is provided with a sleeve, a spherical surface is arranged in the sleeve, then the sleeve is universally connected with a ball head arranged on the fixture base IV-2 through the spherical surface, and the sleeve and the ball head are locked and fixed through friction force. One end of the second support arm is connected to the movable bolt IV-5 through threads, another end is provided with a sleeve, a spherical surface is arranged in the sleeve, then the sleeve is universally connected with a ball head arranged on the clamping part IV-8 through the spherical surface, and the sleeve and the ball head are locked and fixed through friction force.

The clamping part IV-8 can be an existing clamp, and the clamping part clamps the magnetic lubricant flow pipe IV-6 to fix the magnetic circulation nozzle IV-9 and the magnetic circulation recycling nozzle IV-7, and the specific structure thereof will not be described in detail herein.

The support arm IV-4 and the clamping part IV-8 together constitute a fixing mechanism for fixing the magnetic circulation nozzle and the magnetic circulation recycling nozzle, after the magnetic circulation nozzle and the magnetic circulation recycling nozzle are fixed by the fixing mechanism, the magnetic circulation nozzle IV-9 faces the rake face of the turning tool IV-10, and an axis thereof forms a set acute angle with the rake face, and further, the degree of the acute angle is set to 45° to ensure that the magnetic nano lubricant can effectively cover the cutting area, while the magnetic circulation recycling nozzle IV-7 is fixed in the opposite direction, i.e., it is arranged towards the rake face of the turning tool IV-10, an axis thereof forms a set acute angle with the rake face, and further, the degree of the acute angle is set to 45° to ensure that the cutting area can be better covered and the mixed solution of the magnetic nano lubricant and the chips can be recycled.

Figure 6:
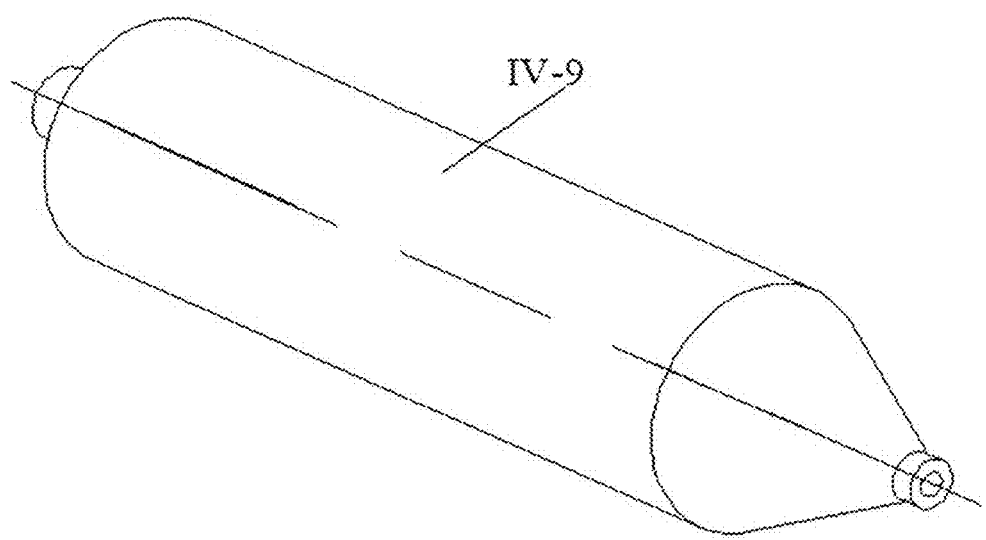
FIG. 6 is a structure diagram of the magnetic circulation nozzle of Embodiment 1 of the present invention.
Figure 7:
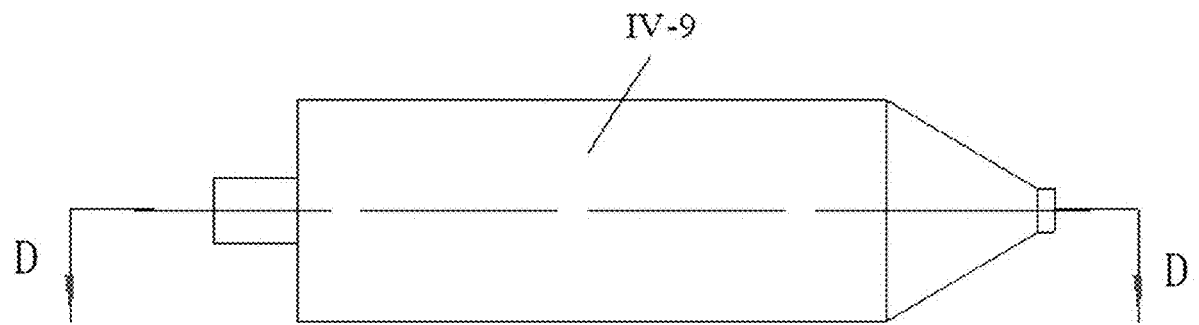
FIG. 7 is a front view of the magnetic circulation nozzle of Embodiment 1 of the present invention.
Figure 8:
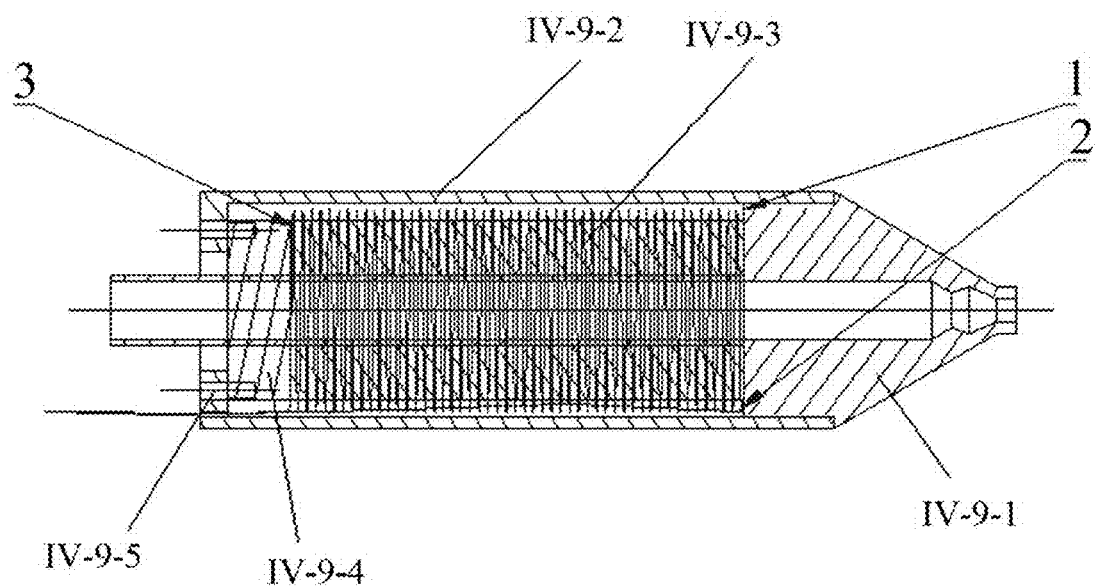
FIG. 8 is a schematic view of the cross-section D of FIG. 7 of the present invention.

As shown in FIGS. 6 to 8, the magnetic circulation nozzle IV-9 comprises a spray part IV-9-1, a shell IV-9-2, a magnet IV-9-3, a gasket IV-9-4 and a fixing screw IV-9-5, and the magnetic nano lubricant provided in the lubricant canister I-1 is delivered into the magnetic circulation nozzle IV-9 by the power of the peristaltic pump III.

Specifically, the spray part IV-9-1 is fixed at one end of the shell IV-9-2, the gasket IV-9-4 is fixed at another end of the shell IV-9-2 by the fixing screw IV-9-5, the magnet IV-9-3 is arranged between the gasket IV-9-4 and the spray part IV-9-1, the magnetic lubricant flow pipeline IV-6 passes through the end of the shell IV-9-2, the gasket IV-9-4 and the magnet IV-9-3 and then abuts against the end of the spray part IV-9-1, the spray part IV-9-1 is provided with a channel coaxially communicated with the magnetic lubricant flow pipeline IV-6, the channel and the magnetic lubricant flow pipeline IV-6 together form a lubricant channel, and the magnetic nano lubricant enters the lubricant channel and then is sprayed out.

Figure 9:
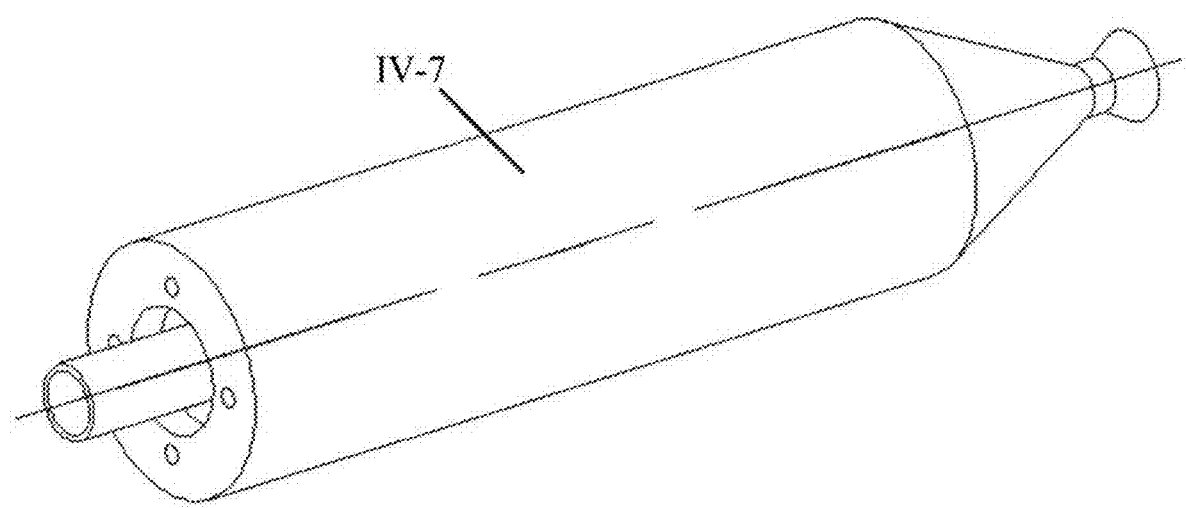
FIG. 9 is a structure diagram of the magnetic circulation recycling nozzle of Embodiment 1 of the present invention.
Figure 10:
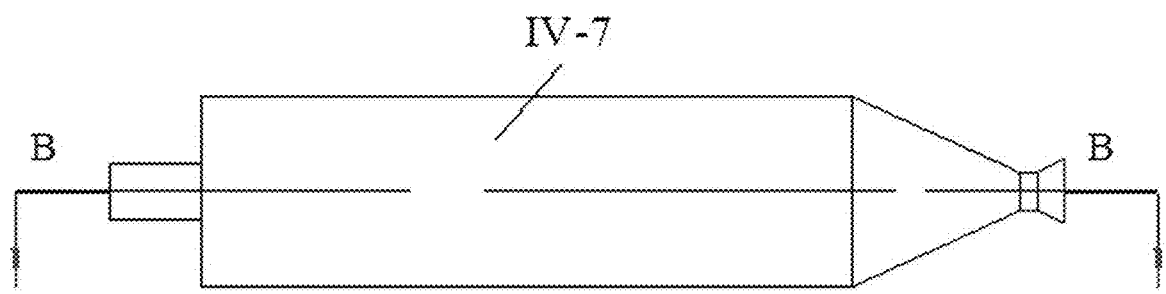
FIG. 10 is a front view of the magnetic circulation recycling nozzle of Embodiment 1 of the present invention.
Figure 11:
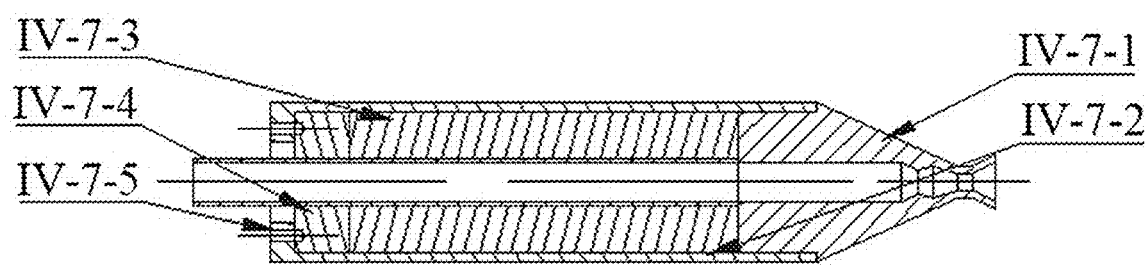
FIG. 11 is a schematic view of the cross-section B of FIG. 10 of the present invention.

As shown in FIGS. 9 to 11, the magnetic circulation recycling nozzle IV-7 comprises a spray part IV-7-1, a shell IV-7-2, a magnet IV-7-3, a gasket IV-7-4 and a fixing screw IV-7-5, and the processed mixed solution of the magnetic lubricant and the chips is absorbed by the magnetic circulation recycling nozzle IV-7 and then flows into the chip filtering mechanism for filtration.

The structure of the magnetic circulation recycling nozzle IV-7 is the same as that of the magnetic circulation nozzle IV-9, and the only difference lies in that the end part of the spray part IV-7-1 is provided with a conical cover, and the end part of the conical cover with smaller area is connected to the spray part IV-7-1 of the magnetic circulation recycling nozzle IV-7, so as to collect the magnetic nano lubricant conveniently.

Figure 15:
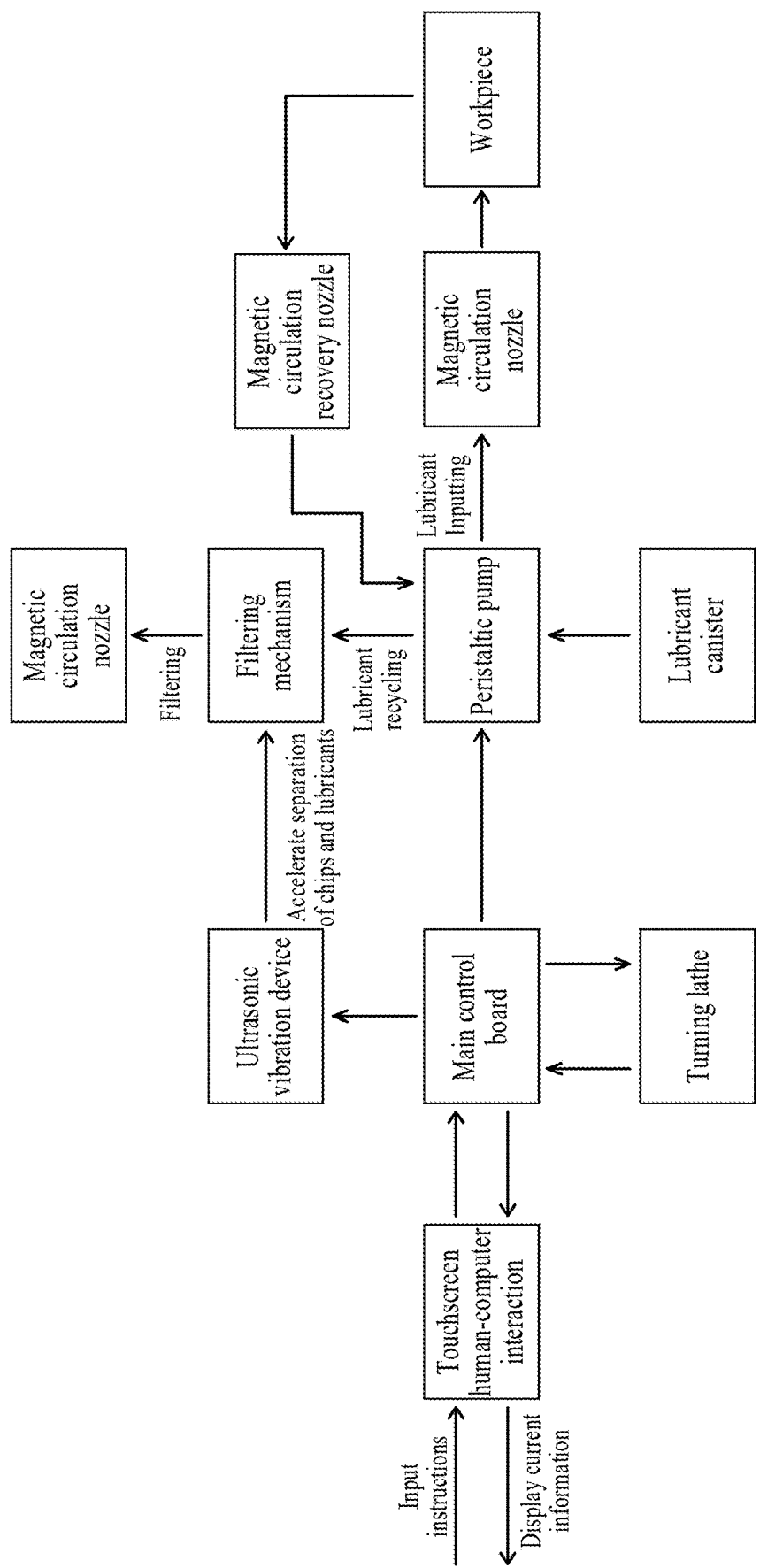
FIG. 15 is a schematic diagram of a control principle of Embodiment 1 of the present invention.

In the present embodiment, as shown in FIG. 15, the ultrasonic vibration device II-4, the ultra-precision machining lathe V, the peristaltic pump III, etc. are all connected to a main control board, and the operations thereof are controlled by the main control board.

In this embodiment, although there are many structural forms of electromagnets, their core parts are iron cores and coils, and when the size and parameters of the iron cores and coils are determined, other size are easy to obtain. Therefore, in the design of direct current (DC) electromagnets, four parameters, namely, iron core radius $r_c$, coil height h, coil turns N and coil wire diameter d, are taken as key parameters, and they are obtained according to known conditions, and then other size are obtained according to proportional relations.

In the preliminary design, the attraction force of the electromagnet can be calculated by use Maxwell's formula, which is:

$$F_x = \frac{B_\delta^2 S}{2\mu_0}$$

wherein, $F_x$ is the attraction force of the electromagnet;
  $B_\delta$ is an operating air-gap flux density (T) at the lower limit of coil voltage (85% of rated voltage);
  S is a magnetic pole area; and
  $\mu_0$ is a vacuum permeability.
The magnetic pole area is calculated as follows:

$$S = \pi r_c^2$$

wherein, $r_c$ is the core radius (m).

The magnetomotive force of coil of the electromagnet is equal to the sum of the magnetic voltage drops of each part of the magnetic circuit, and can be listed as follows:

$$IN = \frac{\phi_\delta}{\Lambda_\delta} + \sum U_m + \sum U_f$$

wherein, IN is the magnetomotive force of coil (A);

$$\frac{\phi_\delta}{\Lambda_\delta}$$

is magnetic voltage drop in the working air gap (A);
$\Sigma U_m$ is the sum of the magnetic voltage drops of each part of the magnetic permeable body (A); and
$\Sigma U_f$ is sum of the magnetic voltage drops in the non-operating air gap (A).
Coil thickness: $\Delta = 2nr_c$;

$$(IN)1 = (1 + K_i)\frac{B_\delta \delta_0}{\mu_0}$$

$$(IN)2 = \frac{U_N}{U_1}(IN)1$$

$U_1 = 85\% \ U_N$

For the DC voltage coil, a circuit equation of the coil is as follows:

$$U = IR = I\frac{\rho l_{pj} N}{\frac{\pi}{4}d^2} = \frac{4\rho(2r_c + \Delta)}{d^2}IN$$

The coil wire diameter is obtained through transposing, as follows:

$$d = \sqrt{\frac{4\rho(2r_c + \Delta)}{U}IN}$$

wherein, U is voltage of coil (V);
  IN is the magnetomotive force of the coil (A), corresponding to the voltage of the coil, if $U=U_1$, then $IN=(IN)1$
After the coil wire diameter is calculated, the formula for calculating the number of turns of the coil can be derived by using the formula of the coil filling factor:

$$k_{ic} = \frac{\frac{\pi}{4}d^2 N}{h\Delta}$$

$$N = \frac{4k_{ic}h\Delta}{\pi d^2}$$

Figure 16A:
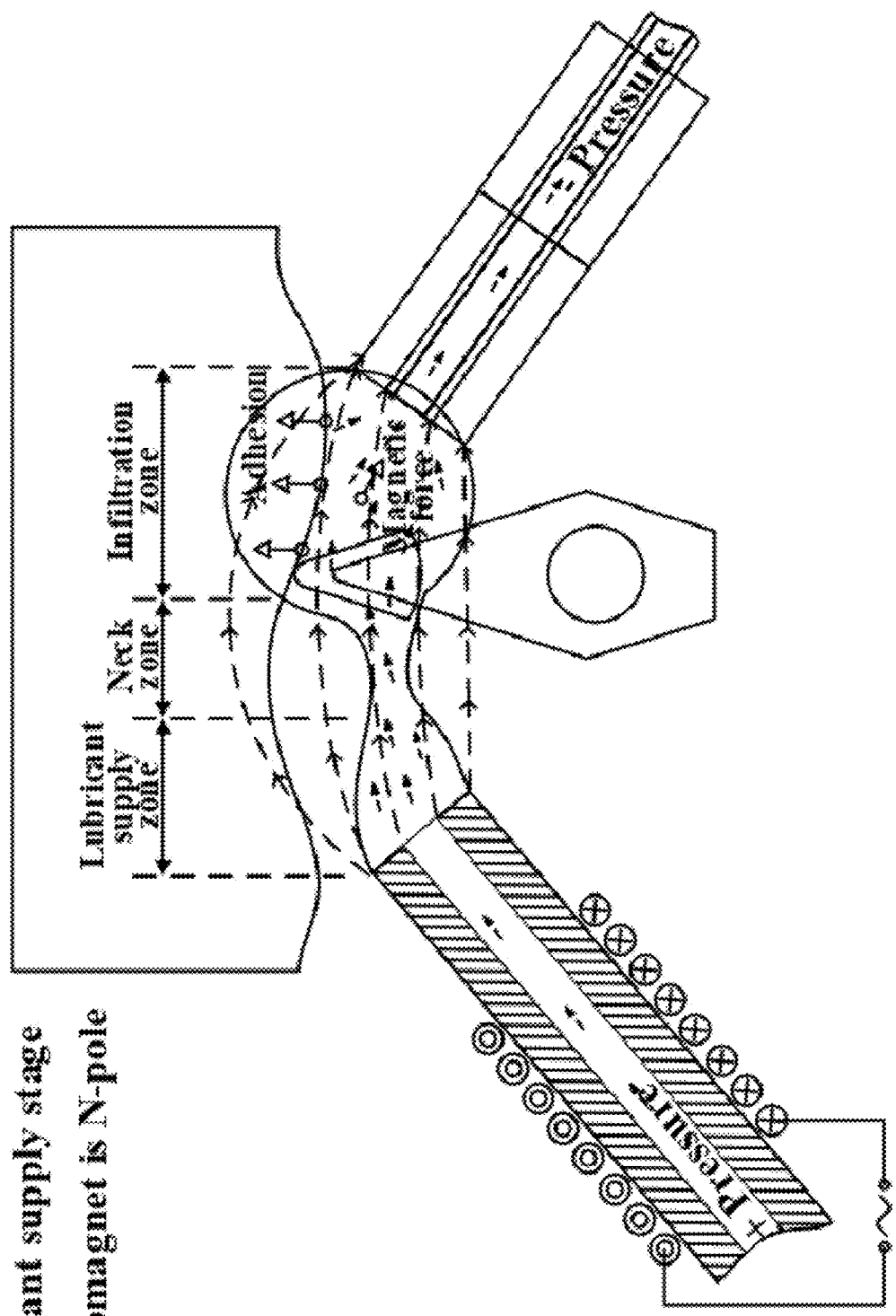
FIG. 16A to FIG. 16C is schematic diagrams of a working principle of Embodiment 1 of the present invention.
Figure 16B:
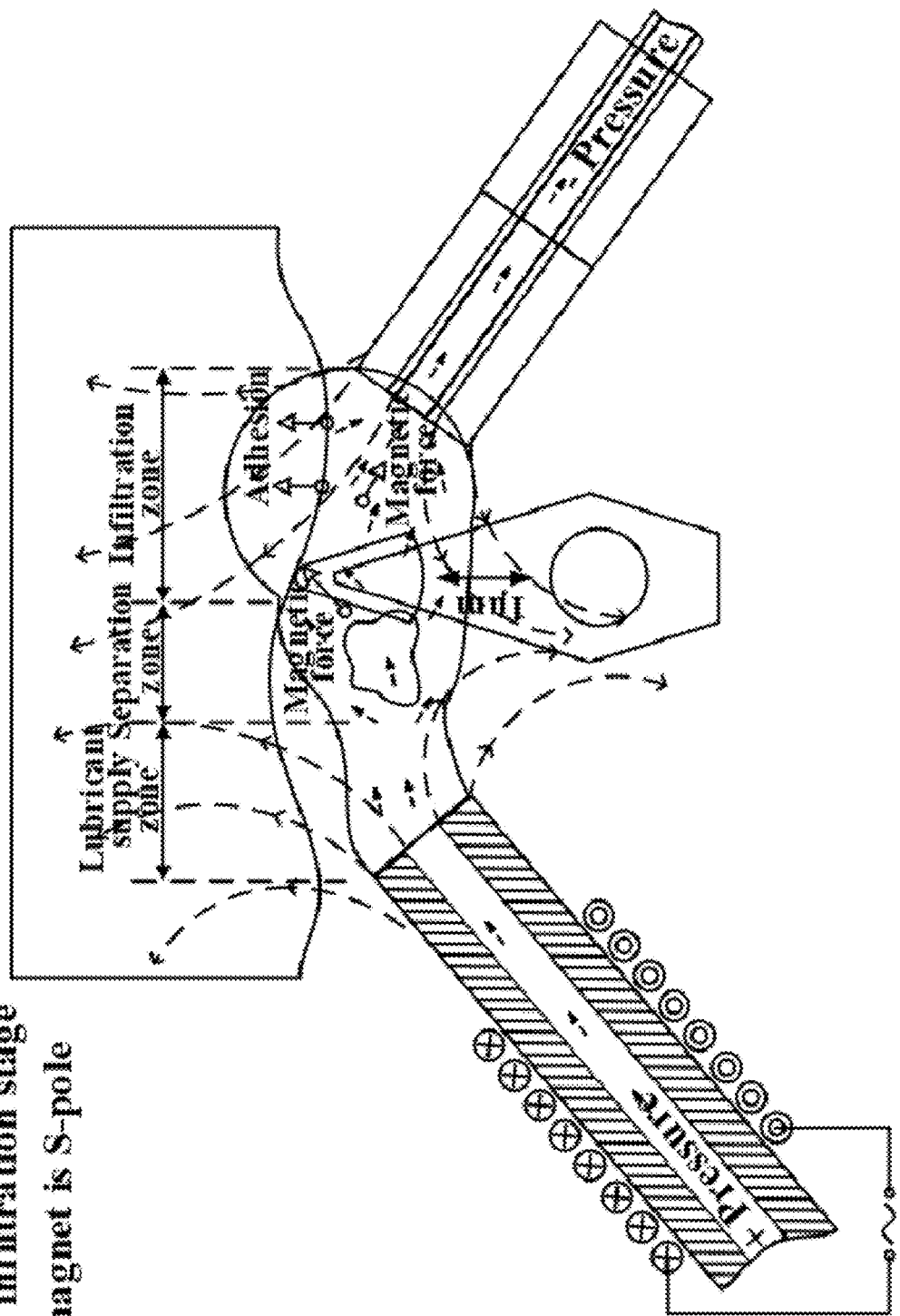
Figure 16C:
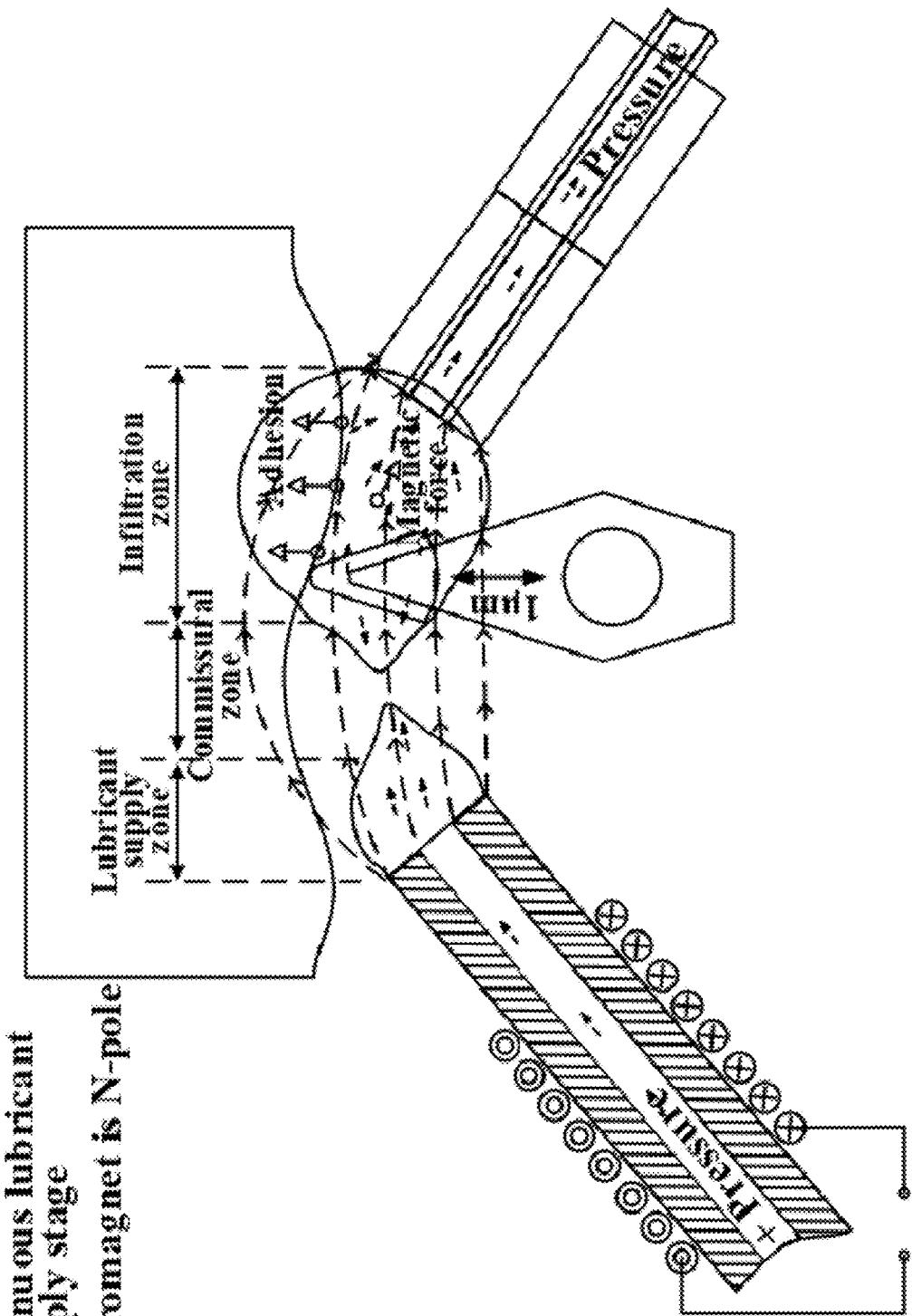

During operation of the turning device of the present embodiment, as shown in FIG. 16, there are:
  when the electromagnet and the permanent magnet are close to the tool side and have different polarities, as shown in FIG. 16A: the two nozzles attract each other and the magnetic field lines are connected; since the magnetic force of the electromagnet is smaller than that of the permanent magnet under the same volume, the magnetic field intensity close to the permanent magnet is large, and the lubricant is attracted to the permanent magnet side, that is, the side close to the infiltration area. At this point, the lubricant shape shown in the figure is formed, with a neck region in the middle;
  when the polarity of the electromagnet is switched, resulting in the same polarity of the electromagnet and the permanent magnet closed to the tool side, as shown in FIG. 16B, magnetic induction lines between the two nozzles repel each other; due to the variation of the magnetic induction lines, the magnetic field in the separation area between the nozzles decreases, causing the lubricant to be torn and separated, so that one part moves to the permanent magnet nozzle and the other part moves to the electromagnet nozzle, then the lubricant is pushed to the cutting area of the tool and the turning tool itself until it is pulled, separated, and appeared as shown in FIG. 16C; and
  when the polarity of the electromagnet is switched to the opposite polarity of the permanent magnet again, the magnetic induction lines are connected, and the lubricant moves from an oil supply area to a joint area (i.e., the neck area and the separation area mentioned above) again, so as to connect with the lubricant in the infiltration area, and to form the state shown in FIG. 16A again.

It can be seen that, when the magnetic induction lines between the two nozzles repel each other, the lubricant droplets are pushed to the cutting area, thus further improving the cooling and lubricating effect of the lubricant.

Figure 17A:
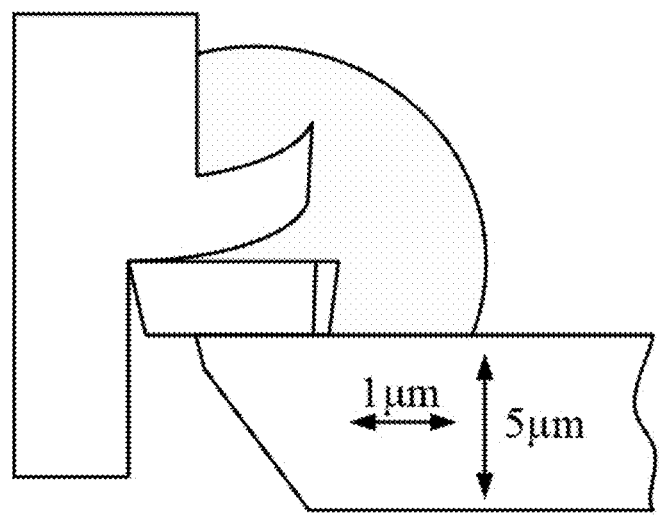
FIG. 17A and FIG. 17B is schematic diagrams of a cutting principle of the turning tool of Embodiment 1 of the present invention.
Figure 17B:
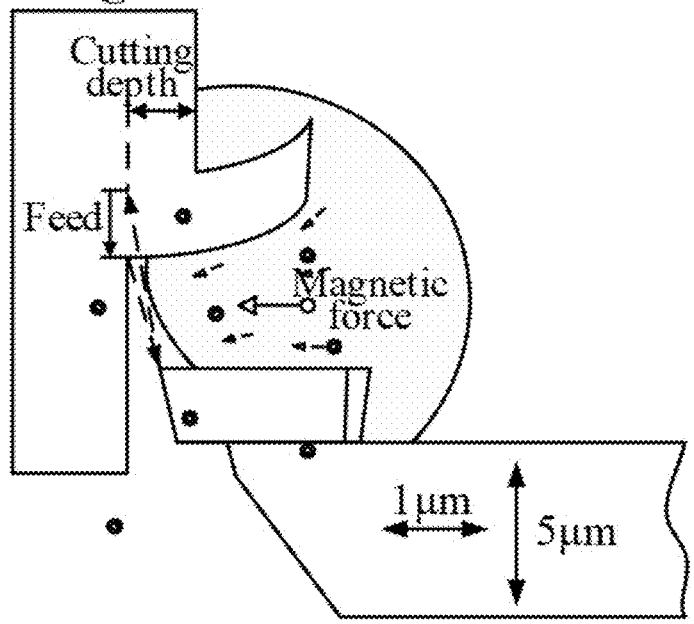

In the turning device of the present invention, the tool generates cutting and concession behaviors under the drive of the two-dimensional ultrasonic auxiliary device, wherein: as shown in FIG. 17A, when the tool moves upward in the two-dimensional direction to cut a workpiece, the tool contacts with the workpiece to remove materials; as shown in FIG. 17B, when the ultrasonic auxiliary device clamps the tool downward and moves rightward to perform the concession, a gap is generated between the tool and workpiece chips, and the generated gap can provide space for lubricant infiltration.

According to the turning device of the present embodiment, the polarities of the ends of the magnets in the magnetic circulation nozzle and the magnetic circulation recycling nozzle facing the turning tool are opposite, and the magnetic circulation recycling nozzle generates negative pressure under the action of the peristaltic pump, so that the magnetic nano lubricant passes through the contact point between the turning tools and the workpiece, and then, is recycled by the magnetic circulation recycling nozzle into the filter device through the attraction of the magnetic nano fluid, so that the magnetic nano fluid is separated from chips, and recycling is achieved; and the ultrasonic vibration device is arranged below the filter device, so that accurate filtration can be achieved, and ultra-precision machining of the workpiece is completed.

The turning device of the present embodiment is provided with a magnetic circulation nozzle and a magnetic circulation recycling nozzle, magnets are arranged in the magnetic circulation nozzle and the magnetic circulation recycling nozzle, a magnetic field can be applied to the sprayed magnetic nano fluid lubricant, simultaneously, the turning tool is connected with a two-dimensional ultrasonic auxiliary device, the two-dimensional ultrasonic auxiliary device can apply ultrasonic vibration to the turning tool to drive the turning chips to be separated, and the two-dimensional ultrasonic auxiliary device drives the turning tool to perform the concession, so that a lubricant infiltration space between the turning tool and a workpiece is provided, traction force is provided for the lubricant through the magnetic field, so that the lubricant can more fully infiltrate the cutting area between the turning tool and the workpiece, and the cooling and lubricating effect is further improved; meanwhile, the magnetic circulation nozzle and the magnetic circulation recycling nozzle adopt a jet mode to cool and lubricate the cutting area, so that the defects existing in the cooling and lubricating mode of adopting atomized liquid drops are avoided; and meanwhile, the magnetic circulation recycling nozzle can form negative pressure through the peristaltic pump, so that the magnetic nano fluid lubricant can be better recycled; and, the filter device can filter the vehicle dust in the lubricant, thereby realizing the recycle and reuse of the lubricant and reducing the processing cost.

Example 2

Figure 18:
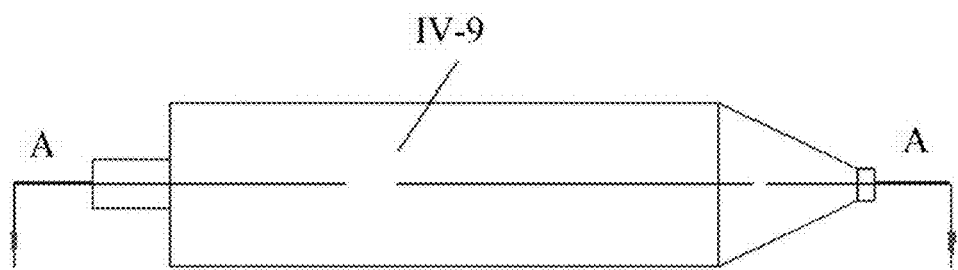
FIG. 18 is a front view of a magnetic circulation nozzle of Embodiment 2 of the present invention.
Figure 19:
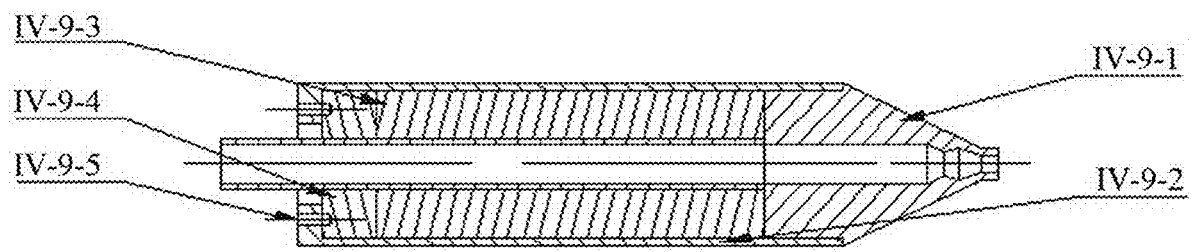
FIG. 19 is a schematic view of the cross-section A of FIG. 18 of the present invention.

As shown in FIGS. 18 to 19, the present embodiment provides a turning apparatus with MQL based on magnetic circulation and ultrasound-assisted infiltration magnetic circulation, which differs from the Embodiment 1 only in that the magnet in the magnetic circulation nozzle adopts a permanent magnet, and the polarity of the end of the permanent magnet in the magnetic circulation nozzle facing the turning tool is opposite to the polarity of the end of the permanent magnet in the magnetic circulation recycling nozzle facing the turning tool. Other structures are the same as those of the Embodiment 1, and will not be described repeatedly here.

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

What is claimed is:

1. A turning apparatus with minimal quantity lubrication (MQL) based on magnetic circulation and ultrasound-assisted infiltration, comprising a turning tool being fixed with a two-dimensional ultrasonic auxiliary device, wherein a magnetic circulation nozzle and a magnetic circulation recycling nozzle are respectively arranged on both sides of the turning tool, a lubricant channel is respectively provided inside the magnetic circulation nozzle and the magnetic circulation recycling nozzle, and a magnet is provided on a periphery of the lubricant channel; wherein, the magnet provided on the periphery of the lubricant channel of the magnetic circulation nozzle is a electromagnet, a coil of the electromagnet is connected to an alternating current (AC) power supply; the lubricant channel of the magnetic circulation nozzle is connected to one end of a first flexible pipe, another end of the first flexible pipe is connected to a lubricant canister after passing through a peristaltic pump, and the peristaltic pump is further connected to one end of a second flexible pipe, another end of the second flexible pipe is connected to an extract opening of the filtering mechanism; the magnetic circulation recycling nozzle is connected to one end of a third flexible pipe, and another end of the third flexible pipe is connected to a liquid inlet of the filtering mechanism.

2. The turning apparatus with MQL based on magnetic circulation and ultrasound-assisted infiltration according to claim 1, wherein the magnetic circulation nozzle is arranged towards a rake face of the turning tool and forms a set acute angle with the rake face of the turning tool; and, the magnetic circulation recycling nozzle is arranged towards a flank face of the turning tool and forms the set acute angle with the flank face of the turning tool.

3. The turning apparatus with MQL based on magnetic circulation and ultrasound-assisted infiltration according to claim 2, wherein a degree of the set acute angle is 45°.

4. The turning apparatus with MQL based on magnetic circulation and ultrasound-assisted infiltration according to claim 1, wherein the magnetic circulation nozzle and the magnetic circulation recycling nozzle are both connected to a fixing mechanism, the fixing mechanism is fixed on a fixture base, and the fixture base is fixed on a support base.

5. The turning apparatus with MQL based on magnetic circulation and ultrasound-assisted infiltration according to claim 4, wherein the fixing mechanism comprises a first supporting arm, one end of the first supporting arm is universally connected to the fixture base, another end of the first supporting arm is rotatably connected to one end of a second supporting arm, another end of the second supporting arm is universally connected to a clamping part, a lubricant flow pipeline of the clamping part is clamped and fixed, the lubricant flow pipeline of the fixing mechanism connected to the magnetic circulation nozzle is connected to the magnetic circulation nozzle, and the lubricant flow pipeline of the fixing mechanism connected to the magnetic circulation recycling nozzle is connected to the magnetic circulation recycling nozzle.

6. The turning apparatus with MQL based on magnetic circulation and ultrasound-assisted infiltration according to claim 1, wherein a conical cover is arranged at an end of the magnetic circulation recycling nozzle facing the turning tool, and one end of the conical cover with a smaller area is connected to the magnetic circulation recycling nozzle.

7. The turning apparatus with MQL based on magnetic circulation and ultrasound-assisted infiltration according to claim 1, wherein the filtering mechanism comprises a filtering box, a liquid inlet connected to the second flexible pipe is provided at one end of a box wall at the top of the filtering box, a filtering plate is arranged obliquely in the filtering box, a liquid inlet end of the filtering plate is arranged below the liquid inlet and higher than a liquid outlet end of the filtering plate, a chip storage groove is provided at one side of the liquid outlet end, an internal space of the filtering box above the filtering plate is connected to the extract opening, and the extract opening is connected to the second flexible pipe.

8. The turning apparatus with MQL based on magnetic circulation and ultrasound-assisted infiltration according to claim 7, wherein an ultrasonic vibration device is arranged below the filtering box to apply ultrasonic vibration to the filtering box.

9. The turning apparatus with MQL based on magnetic circulation and ultrasound-assisted infiltration according to claim 1, wherein both the magnetic circulation nozzle and the magnetic circulation recycling nozzle comprise a shell, wherein one end of the shell is provided with an spray part, another end of the shell is provided with a gasket, the magnet is arranged between the gasket and the spray part, the magnet is sleeved on the periphery of the lubricant flow pipeline, and the spray part is provided with a channel communicated with the lubricant flow pipeline.

10. A turning apparatus with MQL based on magnetic circulation and ultrasound-assisted infiltration, comprising a turning tool being fixed with a two-dimensional ultrasonic auxiliary device, wherein a magnetic circulation nozzle and a magnetic circulation recycling nozzle are arranged on both sides of the turning tool, a lubricant channel is respectively provided inside the magnetic circulation nozzle and the magnetic circulation recycling nozzle, and a magnet is provided on a periphery of the lubricant channel, wherein polarities of ends of the magnets arranged on the periphery of the lubricant channel of the magnetic circulation nozzle and the periphery of the lubricant channel of the magnetic circulation recycling nozzle facing the turning tool are opposite; the lubricant channel of the magnetic circulation nozzle is connected to one end of a first flexible pipe, another end of the first flexible pipe is connected to a lubricant canister after passing through a peristaltic pump, the peristaltic pump is further connected to one end of a second flexible pipe, another end of the second flexible pipe is connected to an extract opening of a filtering mechanism; the magnetic circulation recycling nozzle is connected to one end of a third flexible pipe, and another end of the third flexible pipe is connected to a liquid inlet of the filtering mechanism.

11. The turning apparatus with MQL based on magnetic circulation and ultrasound-assisted infiltration according to claim 10, wherein the magnetic circulation nozzle is arranged towards a rake face of the turning tool and forms a set acute angle with the rake face of the turning tool; and, the magnetic circulation recycling nozzle is arranged towards a flank face of the turning tool and forms the set acute angle with the flank face of the turning tool.

12. The turning apparatus with MQL based on magnetic circulation and ultrasound-assisted infiltration according to claim 11, wherein a degree of the set acute angle is 45°.

13. The turning apparatus with MQL based on magnetic circulation and ultrasound-assisted infiltration according to claim 10, wherein the magnetic circulation nozzle and the magnetic circulation recycling nozzle are both connected to a fixing mechanism, the fixing mechanism is fixed on a fixture base, and the fixture base is fixed on a support base.

14. The turning apparatus with MQL based on magnetic circulation and ultrasound-assisted infiltration according to claim 13, wherein the fixing mechanism comprises a first supporting arm, one end of the first supporting arm is universally connected to the fixture base, another end of the first supporting arm is rotatably connected to one end of a second supporting arm, another end of the second supporting arm is universally connected to a clamping part, a lubricant flow pipeline of the clamping part is clamped and fixed, the lubricant flow pipeline of the fixing mechanism connected to the magnetic circulation nozzle is connected to the magnetic circulation nozzle, and the lubricant flow pipeline of the fixing mechanism connected to the magnetic circulation recycling nozzle is connected to the magnetic circulation recycling nozzle.

15. The turning apparatus with MQL based on magnetic circulation and ultrasound-assisted infiltration according to claim 10, wherein a conical cover is arranged at an end of the magnetic circulation recycling nozzle facing the turning tool, and one end of the conical cover with a smaller area is connected to the magnetic circulation recycling nozzle.

16. The turning apparatus with MQL based on magnetic circulation and ultrasound-assisted infiltration according to claim 10, wherein the filtering mechanism comprises a filtering box, a liquid inlet connected to the second flexible pipe is provided at one end of a box wall at the top of the filtering box, a filtering plate is arranged obliquely in the filtering box, a liquid inlet end of the filtering plate is arranged below the liquid inlet and higher than a liquid outlet end of the filtering plate, a chip storage groove is provided at one side of the liquid outlet end, an internal space of the filtering box above the filtering plate is connected to the extract opening, and the extract opening is connected to the second flexible pipe.

17. The turning apparatus with MQL based on magnetic circulation and ultrasound-assisted infiltration according to claim 16, wherein an ultrasonic vibration device is arranged below the filtering box to apply ultrasonic vibration to the filtering box.

18. The turning apparatus with MQL based on magnetic circulation and ultrasound-assisted infiltration according to claim 10, wherein both the magnetic circulation nozzle and the magnetic circulation recycling nozzle comprise a shell, wherein one end of the shell is provided with an spray part, another end of the shell is provided with a gasket, the magnet is arranged between the gasket and the spray part, the magnet is sleeved on the periphery of the lubricant flow pipeline, and the spray part is provided with a channel communicated with the lubricant flow pipeline.

\* \* \* \* \*